United States Patent [19]

Hojo et al.

[11] 4,336,967
[45] Jun. 29, 1982

[54] BEARING APPARATUS

[75] Inventors: Takeshi Hojo; Michio Fukano, both of Kuroiso, Japan

[73] Assignee: K.K. Tokyo Keiki, Tokyo, Japan

[21] Appl. No.: 111,670

[22] Filed: Jan. 14, 1980

[51] Int. Cl.³ ............................................. F16C 11/12
[52] U.S. Cl. ..................................... 308/2 A; 74/5 F
[58] Field of Search .................. 308/2 R, 2 A; 74/5 F

[56] References Cited

U.S. PATENT DOCUMENTS

| | | | |
|---|---|---|---|
| 3,181,851 | 5/1965 | Troeger | 308/2 A |
| 3,290,949 | 12/1966 | Samet | 308/2 A |
| 3,722,296 | 3/1973 | Hurlburt et al. | 308/2 A |
| 3,807,029 | 4/1974 | Troeger | 308/2 A |
| 4,122,689 | 10/1978 | Beardmore | 74/5 F |

FOREIGN PATENT DOCUMENTS 2626800 12/1977 Fed. Rep. of Germany ........ 74/5 F

OTHER PUBLICATIONS

Weinstein, Warren, "Flexure-Pivot Bearings", *Machine Design*, Jun. 10, 1965, pp. 150-157.
Weinstein, Warren, "Flexure-Pivot Bearings", *Machine Design*, Jul. 8, 1965, pp. 136-145.

*Primary Examiner*—Richard R. Stearns
*Attorney, Agent, or Firm*—Hill, Van Santen, Steadman, Chiara & Simpson

[57] ABSTRACT

A bearing apparatus is disclosed which has a first attaching member secured to a fixed portion, a flexible member, a second attaching member secured to a rotary portion, the flexible member being attached to the first and second attaching members, and a flexible portion formed on the flexible member. In this case, the neutral plane of the flexible portion includes the rotary axis of the rotary portion and the center in the lengthwise direction of the flexible portion coincides with the rotary axis of the rotary portion.

1 Claim, 7 Drawing Figures

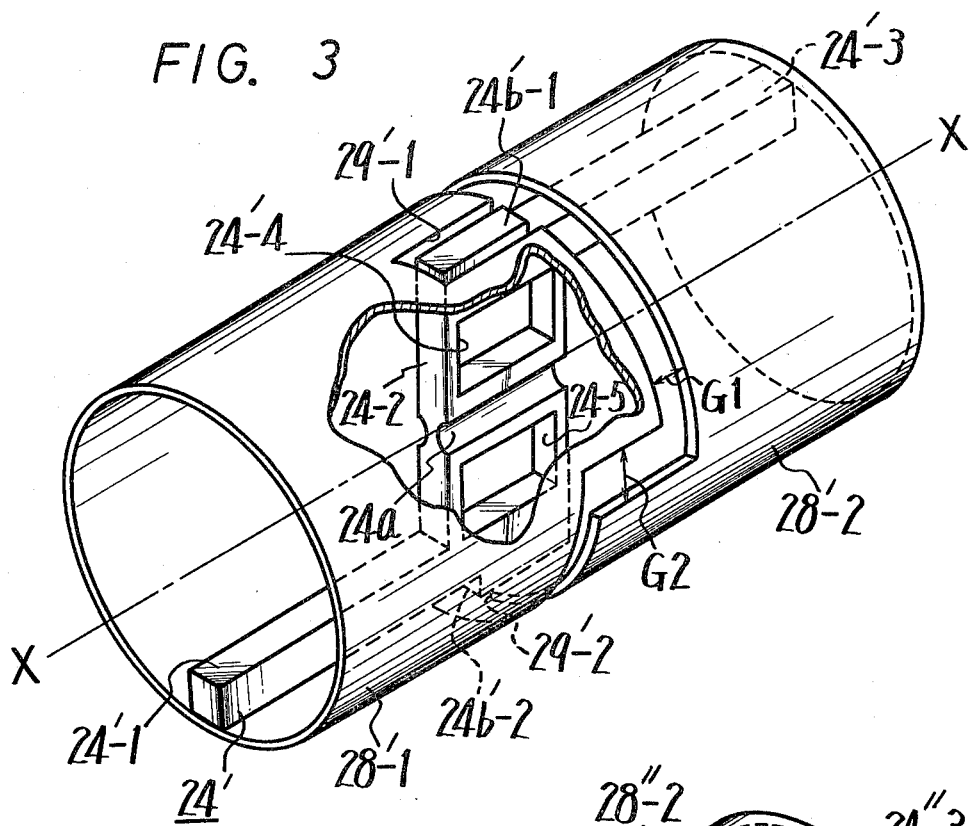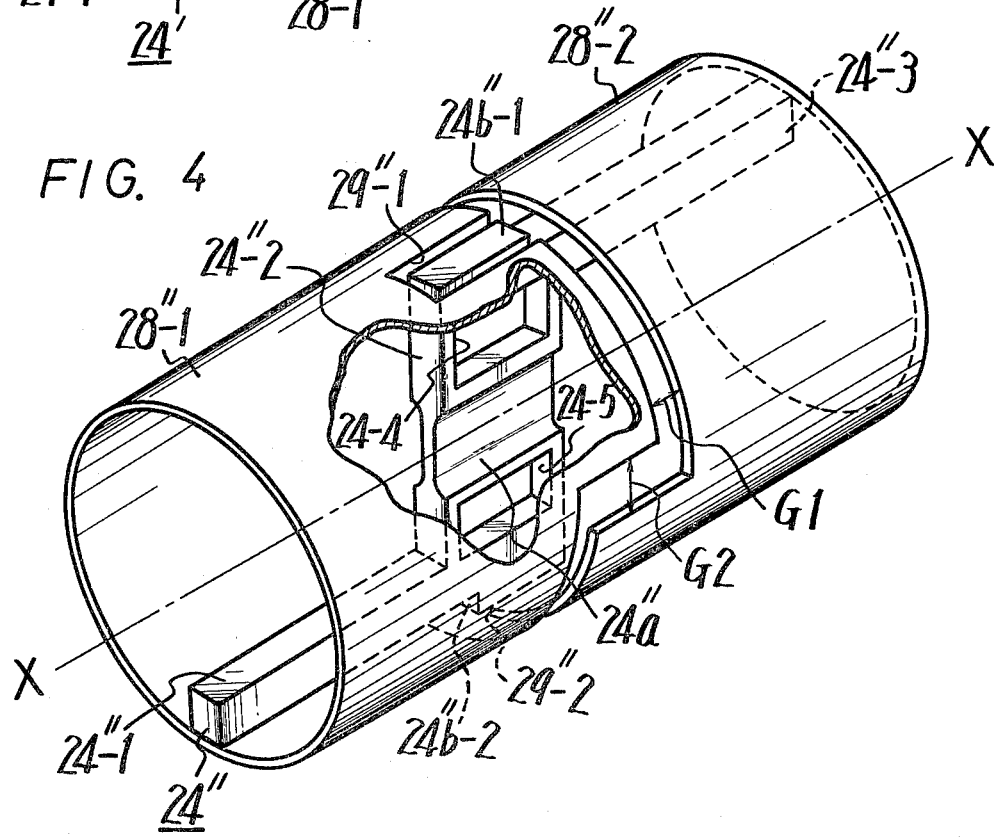

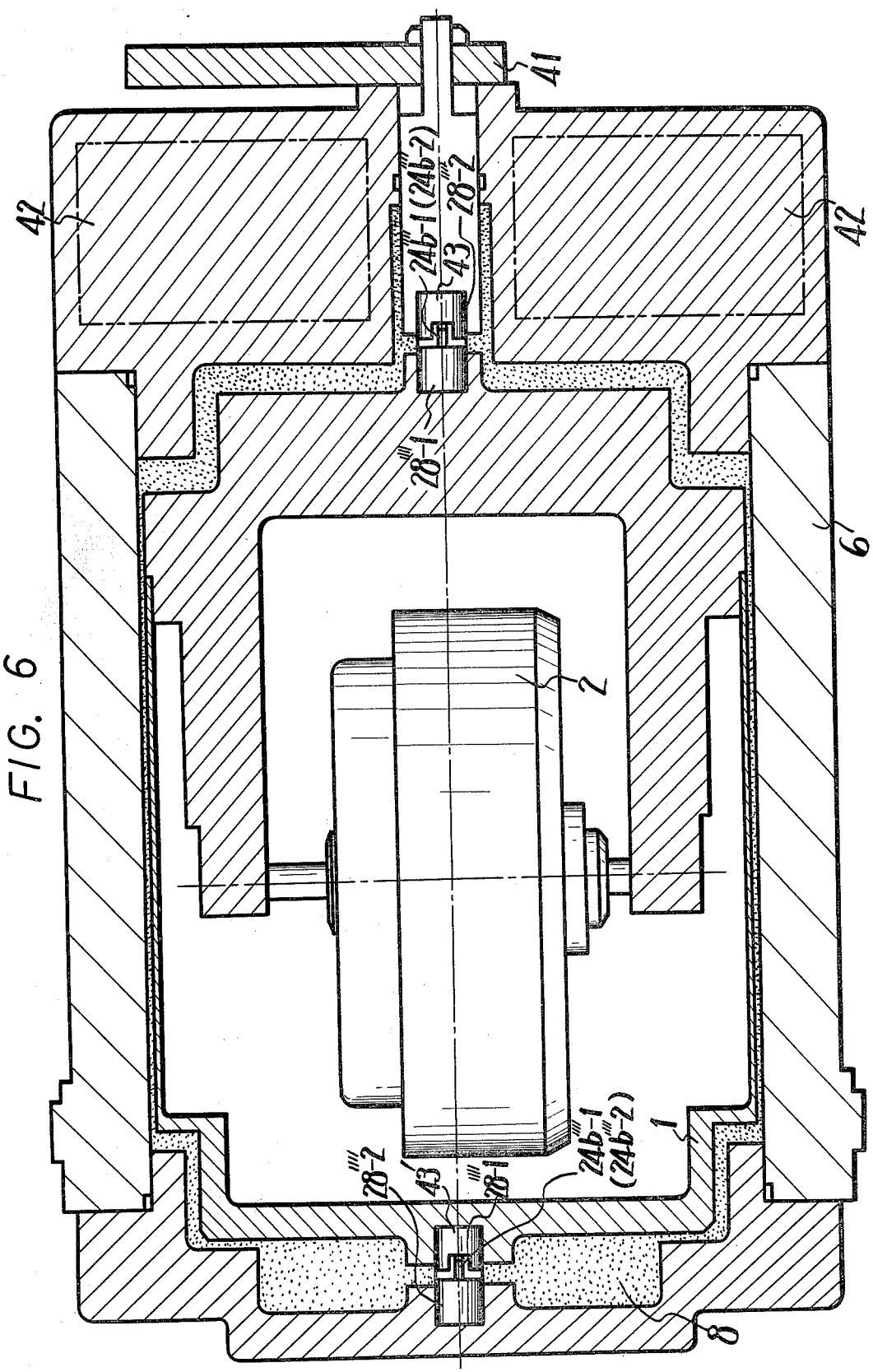

BEARING APPARATUS

BACKGROUND OF THE INVENTION

1. Field of the Invention

The present invention relates generally to a bearing apparatus, and is directed more particularly to a bearing apparatus suitable for use with a gyro apparatus such as a gyroscope in which the weight of a gyro case is supported by the buoyancy of floating liquid.

2. Description of the prior art

In the art, a jewel bearing apparatus, a ball bearing apparatus, a magnetic bearing apparatus, a suspension wire has been proposed as the bearing apparatus for supporting, for example, the horizontal and vertical shafts of a gyroscope. However, the jewel bearing apparatus and the ball bearing apparatus have a defect in that they have large rotational fraction. The magnetic bearing apparatus has a defect because it is complicated and expensive, and the suspension wire has a defect in that its operation is unstable. That is, up to now there has been proposed no bearing apparatus suitable for use with a gyroscope which is inexpensive and highly accurate.

OBJECTS AND SUMMARY OF THE INVENTION

Accordingly, an object of the presernt invention is to provide a novel bearing apparatus.

Another object of the invention is to provide a bearing apparatus suitable for use in a gyroscope.

A further object of the present invention is to provide a bearing apparatus which is simple in construction, is very accurate and cheap.

A still further object of the invention is to provide a bearing apparatus for use with an inertial element such as an accelerometer, angular accelerometer or the like.

According to an aspect of the present invention, a bearing apparatus is provided which comprises:

(a) a first attaching member which is attached to a fixed portion;

(b) a flexible member;

(c) a second attaching member which is attached to a rotary portion with, said flexible member being attached to said first and second attaching members; and (d) a flexible portion formed on said flexible member, the neutral plane of said flexible portion including the rotary axis of said rotary portion and the center of said flexible portion coinciding with the rotary axis of said rotary portion.

The other objects, features and advantages of the present invention will become clear from the following description taken in conjunction with the accompanying drawings through which the like references designate the same elements and parts.

BRIEF DESCRIPTION OF THE DRAWINGS

FIGS 3 through 5 are respectively perspective partially cut-away views showing other examples of the present invention;

FIG. 6 is a side view showing, partially in cross section, a further example of the invention which is applied to the output axis bearings of a single degree of freedom gyro.

DESCRIPTION OF THE PREFERRED EMBODIMENTS

Before describing the present invention a gyro apparatus such as a gyroscope, to which a bearing apparatus of the invention may be applied to obtain good results, will be described with reference to FIG. 1 which illustrates a perspective view of the gyroscope.

Figure 1:
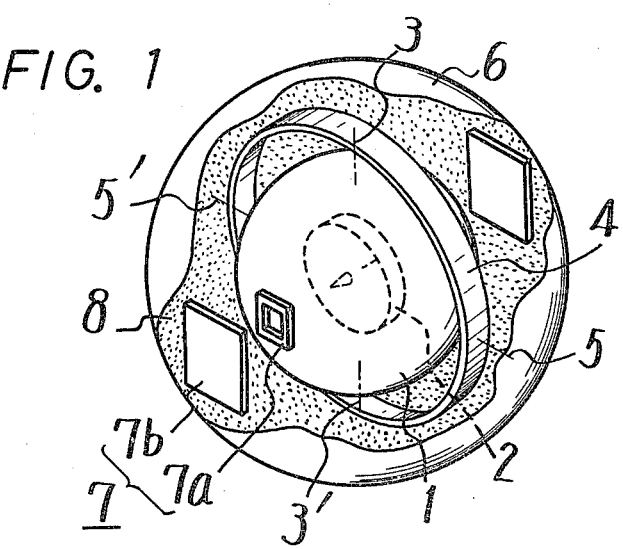
FIG. 1 is a perspective view, partially cut away view, showing an example of a gyroscope to which the present invention can be applied.

FIG. 1 illustrates a gyro case 1 within which a gyro rotor 2 that can rotate at high speed is mounted. The gyro case 1 is rotatably supported about the vertical axis with bearing apparatus 3, 3' forming vertical shafts by a gimbal ring 4. The portions within the gimbal ring 4 are rotatably supported about the horizontal axis with bearing apparatus 5, 5' forming horizontal shafts by an outer housing 6. The space between the outer housing 6 and the gyro case 1 is, charged with a liquid 8 for floating and supporting the weight of the gyro case 1 due to its buoyancy. Thus, the static load of the gyro case 1 exerted on the bearing apparatuses 3, 3' and 5, 5' will be removed to improve the torque properties of the bearing apparatuses. A pick-up aparatus 7 is provided which consists of a first pick-up member 7a attached to the gyro case 1 and a second pick-up member 7b attached to the outer housing 6 and which detects the angular displacement or deviation of the spin axis of the gyro motor 2 about the vertical and horizontal axes.

In general, the gyroscope produces a torque which is applied to the outer housing 6 about the vertical or horizontal axis of the gyro case 1. However, since this torquer has no direct relation to the present invention, it is not shown in FIG. 1 and also it is not described. Further, although not shown, a servo apparatus is generally provided on the outside of this kind of gyro apparatus which provides a control so that the output signal from the pick-up apparatus 7 will be zero and to thereby produce zero angular displacement between the gyro case 1, the gimbal ring 4; and the outer housing 6.

The prior art jewel bearing apparatus, ball bearing apparatus used as the vertical and horizontal bearing apparatuses 3, 3' and 5, 5' of the gyroscope shown in FIG. 1 have the defects set forth above.

Now, the present invention will be described with refernce to the attached drawings.

An example of the bearing apparatus according to the present invention, which will be employed as the bearing apparatus for the horizontal shaft of the gyroscope shown in FIG. 1, by way of example, will be described with reference to FIG. 2.

Figure 2:
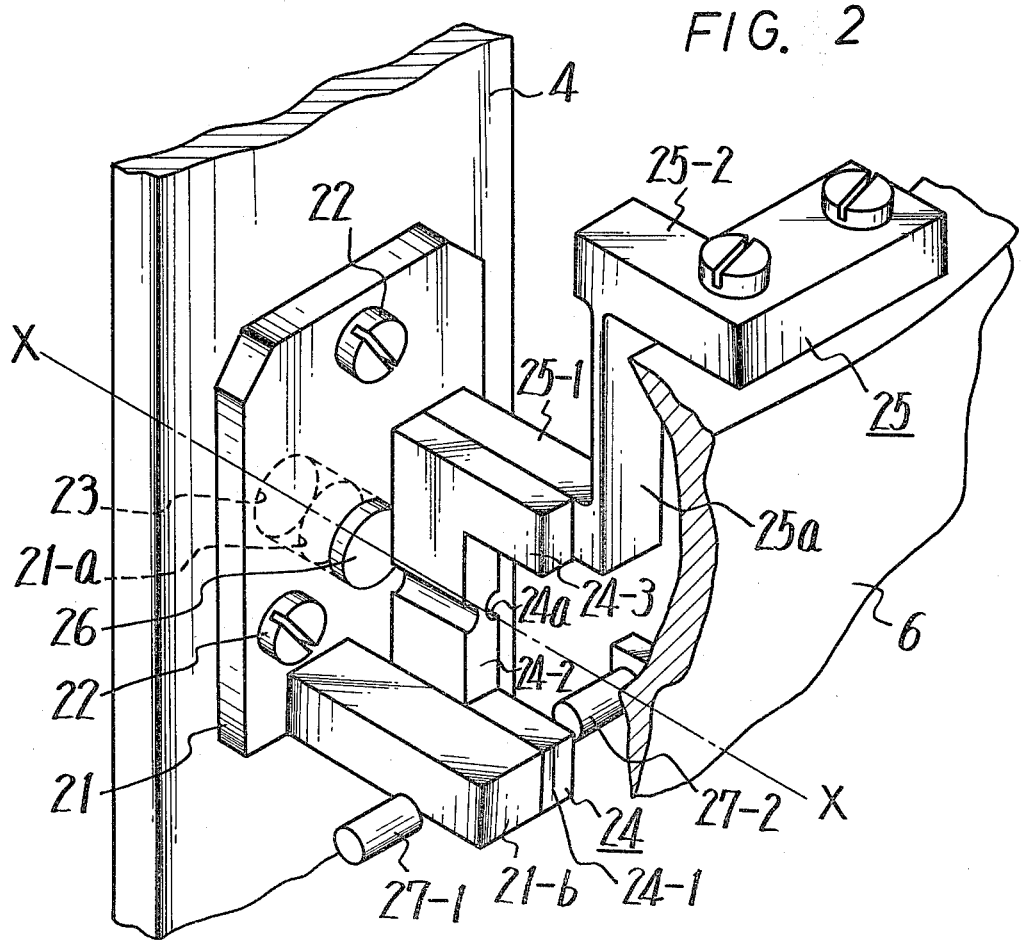
FIG. 2 is a perspective view showing an example of the bearing apparatus according to the present invention which is applied to the gyroscope shown in FIG. 1.

In FIG. 2, an attaching metal member 21 made of a metal plate is fixed to, for example, the outer side of the gimbal ring 4 and has formed therethrough a positioning bore 21-a. The attaching metal member 21 is secured to the gimbal ring 4 at a predetermined position in a manner such that a positioning pin 26 can be inserted into the positioning bore 21-a formed through the metal member 21 and through a positioning bore 23 formed through the gimbal ring 4 along its horizontal axis X-X. Bolts 22 are screwed through the metal member 21 and the gimbal ring 4. A projection member 21-b made of, for example, metal is secured to the attaching metal member 21 at a position below the positioning bore 21-a and extends outwardly parallel to the axis X—X to (in the direction from the gimbal ring 4 to the outer housing). A substantially U-shaped flexible member 24 made of, for example, metal of high tensile strength is provided which has lower and upper arms 24-1 and 24-3, each substantially parallel to the axis X—X, and a leg 24-2 whch extend in the vertical direction and conects the lower and upper arms 24-1 and 24-3. The lower arm 24-1 is secured to the projection member 21-b. Semi-circular recesses are formed on both sides of the leg 24-2 of the flexible member 24 substantially along the axis X—X to reduce the thicness of the leg 24-2 and to form a flexible portion in the leg 24-2 on the axis X—X. The flexible member 24 is attached to the projection member 21-b so that the flexible axis of the flexible portion 24a is coincident with the center axis of the positioning bore 21-a and pin 26 i.e. the axis X—X. Accordingly, the flexible member 24 will be flexible about the axis X—X. The upper arm 24-3 of the flexible member 24, which is parallel to the lower arm 24-1 thereof, is coupled through an attaching metal member 25 to the outer housing 6. As shown in FIG. 2, the attaching metal member 25 consists of a lower arm 25-1, which is parallel to the upper arm 24-3 of the flexible member 24 (parallel to the axis X—X), an upper arm 25-2 similar to the lower arm 25-1 and a flexible portion 25a which couples the arms 25-1 and 25-2. The lower arm 25-1 is secured to the upper arm 24-3 of the flexible member 24 and the upper arm 25-2 is fixed to the outer housing 6 by means of, for example, bolts. Such, an example of the bearing apparatus according to the present invention is assembled to the gyroscope as the bearing apparatus for one of the horizontal shaft. The bearing apparatus for the other horizontal shaft similar to the one described.

The flexible portion 25a of the attaching metal member 25 is provided to prevent the flexible portion of the flexible member 24 from being damaged by thermal expansion of the gimbal ring 4 in the direction of the axis X—X, because the flexible portion 25a can be flexed a small amount in the direction of the axis X—X to reduce the stress in the flexible member 24. To this end, the flexible portion 25a is made of a plate which is thin in the direction of axis X—X.

In FIG. 2, 27-1 and 27-2 designate stoppers which are fixed to the outer housing 6, respectively, so as to maintain the stress in the flexible portion 24a of the flexible member 24 lower than a predetermined value and hence to prevent the flexible portion 24a from being damaged or deformed.

The bearing apparatus of the invention described above for the horizontal shaft of the gyroscope can be applied to the bearing apparatus for the vertical shafts of the gyroscope almost without change and a description of such structure is not given.

Another example of the present invention will be described with reference to FIG. 3 which is a perspective view. In the example of the invention shown in FIG. 3, the flexible member 24' with a flexible portion 24'a is secured to both cylindrical attaching metal members 28'-1 and 28'-2 which are respectively attached to the gimbal ring 4 and the housing 6 of a gyroscope, for example, as shown in FIG. 1. That is, in the example shown in FIG. 3, the flexible member 24' is formed with two arms 24'-1 and 24'-3, which extend in the horizontal direction or direction of the axis X—X in parallel with each other but the opposite directions and a leg 24'-2, which connects both the arms 24'-1 and 24'-3 and extends in the vertical, up and down direction or direction perpendicular to the axis X—X in FIG. 3. One of the arms, such as the lower arm 24'-1 in the example of FIG. 3 is fixed to the inside of one cylindrical attaching metal member 28'-1 along its axial in the direction i.e. direction parallel to the axis X—X and the other arm or upper arm 24'-3 is fixed to the inside of the other cylindrical attaching metal member 28'-2 along its axial direction i.e. direction parallel to the axis X—X. The flexible portion 24'a of this example is formed similar to the flexible portion of the example of FIG. 2 by providing a groove with a substantially semi-circular crosssection in both sides of the leg 24'-2 with their axial directions coincident with the axis X—X. Accordingly, the flexible member 24' can be flexed about the axis X—X, in other words, the attaching metal member 28'-2 can be rotated about the axis X—X so that the attaching metal member 28'-1 will perform the function of a bearing. In the example of FIG. 3, by securing the cylindrical attaching metal members 28'-1 and 28-2 will the gimbal ring 4 and housing 6, respectively, in such a manner that the axis X—X common to them coincides with the horizontal axis X—X of the gimbal ring 4 of the gyroscope, positioning with the positioning pin 26, positioning bores 21-a, 23 of the example shown in FIG. 2 can be carried out. In this case, between the opposing portions of both the attaching metal members 28'-1 and 28'-2, there are provided gaps G1 and G2 in order to assure that both the members 28'-1 and 28'-2 can be moved a small amount in the direction of the axis X—X and also rotated slightly about the axis X—X.

In the example of the invention shown in FIG. 3, a recess 29'-1 is formed in, for example, an upper portion of one attaching metal member 28'-1, and a similar recess 29'-2 is formed at the corresponding lower portion of the other attaching metal member 28'-2 to respectively receive with small clearance projections 24'b-1 and 24'b-2; which are formed on the upper and lower end surfaces of the leg 24'-2, and the stopper function is performed similar to the stoppers 27-1 and 27-2 of the example shown in FIG. 2.

Further, in the example of FIG. 3, rectangular-shaped bores 24'-4 and 24'-5 are respectively formed through the leg 24'-2 above and below the flexible portion 24'a to reduce the thickness of the leg 24'-2 in the direction of the axis X—X, so that the leg 24'-2 can be flexed in the axis X—X when it is subjected external forces in the same direction.

FIG. 4 is a perspective view showing a further example of the invention. The difference between the examples of FIGS. 3 and 4 is in the shape of the flexible portion 24a. That is, in the example of the invention shown in FIG. 4, at the both sides of the vertical leg 24''-2 of the flexible member 24'' coincident wth the axis X—X, there are provided recesses each of which is flat in the thickness direction of the leg 24''-2 or has a U-shaped cross which is wide in the lengthwise direction of the leg 24''-2 so as to provide the thin portion in the leg 24''-2, which is long in the up and down direction of the leg 24''-2, to thereby provide the flexible portion 24''-a. The remaining construction of the example shown in FIG. 4 is substantially the same as that of the example shown in FIG. 3, so that the remaining parts of FIG. 4 are indicated with references which are the same as those of FIG. 3.

Figure 5:
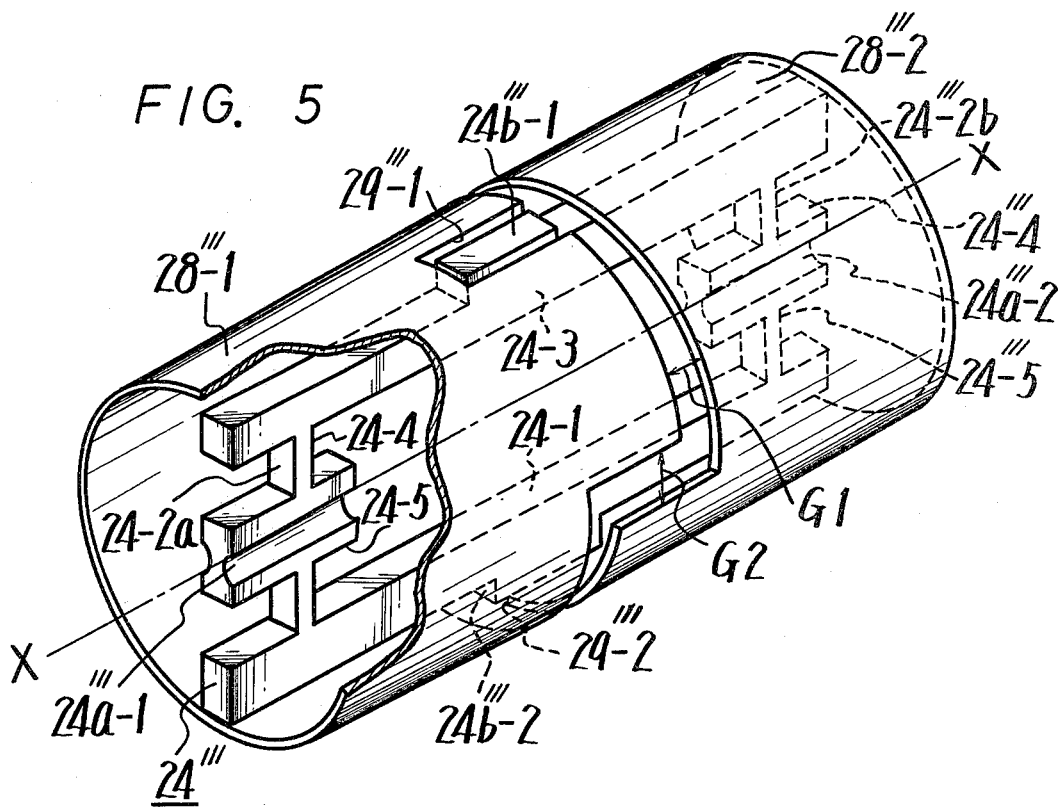

FIG. 5 shows a further example of the present invention in a perspective view. The difference between the example of FIG. 5 and those of FIGS. 3 and 4 is in the flexible member 24. That is, in the example of FIG. 5, the flexible member 24''' is made of an approximately rectangular frame. In this case, a substantially half portion of the lower arm 24'''-1 of the flexible member 24''' is secured to the cylindrical attaching metal member 28''''-1 and a substantially half portion of the upper arm 24''''-3 of the flexible member 24'''' is secured to the other cylindrical attaching metal member 28''''-2 in a manner similar to the examples of FIGS. 3 and 4. The remaining halves of the lower and upper arms 24''''-1 and 24''''-3 are spaced from the cylindrical attaching metal members 28''''-2 and 28''''-1, respectively. Flexible portion 24'''a-1 and 24'''a-2 similar to, the flexible portion 24'a of FIG. 3 are respectively formed on two legs 24'''-2a and 24'''-2b which are parallel to each other and connect both the lower and upper arms 24'''-1 and 24'''-3 at their end portions to divide the flexible portion 24'''a of the prior examples into two separate flexible portions 24'''a-1 and 24'''a-2 which are spaced apart as far as possible as they can be in the direction of the axis X—X. Thus, this example of FIG. 5 is enhanced in strength for the moment load about the axis perpendicular to the axis X—X without increasing the spring torque constant about the axis X—X as compared to the example of FIGS. 3 and 4. The other construction of the example shown in FIG. 5 is substantially the same as that of the example shown in FIGS. 3 or 4. In place of the rectangular bores 24-4 and 24-5 in the examples of FIGS. 3 and 4, in the example of FIG. 5, substantially U-shaped recesses 24'''4 and 24'''5, are respectively formed at both sides of the legs 24'''-2a and 24'''-2b to make the up and down portions thin in the direction of the axis X—X.

FIG. 6 is a partially cross-sectional side view showing a case where one of the bearing apparatuses of the present invention shown in FIGS. 3 to 5 is applied to a well known single degree of freedom gyro apparatus. In FIG. 6, the parts or elements having the functions and names same as those of the gyroscope shown in FIG. 1 are marked with the same references, and their description will be omitted.

In FIG. 6, 42 designates a bellows, which are used to absorb the thermal expansion of the floating liquid 8.

In the example of FIG. 6, the bearing apparatus of the present invention such as shown in FIGS. 3 to 5 is applied to output axis bearings 43 and 43' which correspond to the vertical shafts 3 and 3', respectively. That is, one of the cylindrical attaching metal members 28''''-1 and 28'' ∝ -2, which are coupled by the flexible member 24, or attaching metal member 28''''-1 in the illustrated example is secured to the gyro case 1, and the other cylindrical attaching metal member 28''''-2 is secured to the outer housing 6. Thus, the bearing apparatuses according to the present invention are attached to the output axis bearings 43 and 43', respectively. In FIG. 6, 41 denotes an adjuster for setting the initial torque of the bearing apparatus to zero.

Figure 7:
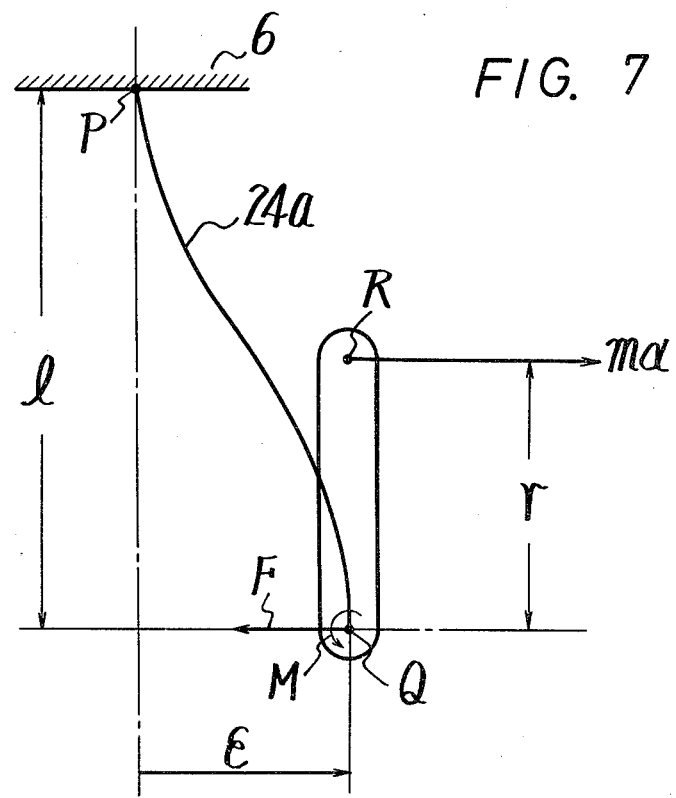
FIG. 7 is a schematic diagram used to explain the theory of the invention.

Now, the theory of the present invention will be described with reference to FIG. 7 which is such a schematic diagram of the horizontal shaft bearing apparatus 5 of FIG. 1 as viewed from the direction of the horizontal axis. The flexible member 24 is fixed at its one end P to the housing 6 and at its other end Q to the gimbal ring 4 (in FIG. 7 the flexed state of the flexible portion 24a of the flexible member 24 is only shown). In this case, the center of gravity of the portion within the gimbal ring 4 (which coincides with the center of the buoyancy) exists at a point R above the lower end Q of the flexible portion 24a by a length r. Although the parts within the gimbal ring 4 are so adjusted that their weight coincides with the buoyancy by the floating liquid 8, there may exist a small residual mass $\Delta m$ due to the fact that there remains a portion, not adjusted due to thermal variations and so on. When the acceleration in the lengthwise direction of the flexible portion 24a acts on the residual mass $\Delta m$, the flexible portion 24a is resiliently deformed a little in its lengthwise direction to balance with the residual mass $\Delta m$. Hence no torque problem is present. However, when as shown in FIG. 7, an acceleration $\alpha$ acts on the flexible portion 24a in the direction perpendicular to the length-wise direction of the flexible portion 24a, the neutral line of the flexible portion 24a is flexed, which is caused by to a force $\Delta m \cdot \alpha$, in the shape of an S with the gradient of the points or fixed points P and Q being kept zero by the operation of the servo-follower system. As a result, the point Q is displaced by $\epsilon$ and then balanced. At the same time, in order to keep the S-shaped deflection, it is necessary that a moment M is applied on the point Q which acts as the torque for the gyro. As a result, the bearing apparatus using the above flexible member has drift sensitivity to acceleration in the horizontal direction and hence can not be used as a bearing of the gyro.

However, the bearing apparatus for the gyro according to the present invention removes the above defect, causes no drift for acceleration, and is highly accurate, very simple in construction and is inexpensive.

As described above, the feature of the present invention resides in the following point. That is, in order to avoid that the acceleration $\alpha$ in the direction perpendicular to the lengthwise direction of the flexible member acts on the residual mass $\Delta m$ to generate the moment M and hence to cause gyro drift, the center of gravity R of the gyro (on the horizontal axis) is positioned above the point Q, at which the flexible portion 24a is coupled to the gimbal ring 4, by the distance r, whereby a moment F·r, which is produced by the force F caused by the flexion $\epsilon$ of the flexible portion 24a about the center of gravity R, is balanced with the moment M and even if the displacement $\epsilon$ is caused by the acceleration $\alpha$, no torque is produced in the gyro.

Now, the condition of M = F·r will be calculated for the flexible portion 24a of the thin plate shape shown in FIG. 4, by way of example. If the length of the flexible portion 24a is taken as l, r = $\frac{1}{2}$l. Thus, if the center of gravity R of the gyro is located at the center of the flexible portion 24a in its lengthwise direction, the bearing apparatus of the present invention becomes such that it does not sense to the acceleration regardless of the temperature change of the floating liquid 8, or the variations of the residual mass $\Delta m$ and so on.

Further, in the case of the flexible portion 24a shown in FIG. 3, if the center of gravity R of the gyro is positioned substantially at the center of the flexible portion 24a in its lengthwise direction, namely at its thinest portion, the bearing apparatus of the invention shown in FIG. 3 does not sense the acceleration.

The above description relates to cases such that the present invention is applied to the gyro apparatus which uses floating liquid, but the present invention can be of course applied to a gyro apparatus which does not use floating liquid if the requirement for the accuracy is suitably selected.

The flexible member, in addition to being formed by recesses in the plate, can be made of a resilient material.

The above description is for a case where the bearing apparatus of the present invention is used as the bearing of the gyro, but it will be clear that the bearing apparatus of the present invention can be used as an bearing apparatus of the accelerometer and so on.

It will be apparent that many modifications and variations could be effected by one skilled in the art without departing from the spirits or scope of the novel concepts of the present invention, so that the spirits or scope of the invention should be determined by the appended claims only.

We claim as our invention:

1. A bearing apparatus comprising, a fixed portion, a rotary member, a first cylindrical member which is to be secured to said fixed portion and has a tubular axis coincidence with a rotation axis of said rotary member, a second cylindrical member which is to be secured to said rotary member and has a tubular axis coicidence with the rotation axis of the rotary member, first and second opposed bar members respectively attached to said first and second cylindrical members on the insides thereof and aligned with each other, two flexible members attached to said first and second opposed bar members at opposite ends thereof so as to form a single substantially rectangular frame body, each of said two flexible members having a pair of arms and elongated reduced cross-section portions aligned on the common center axis of said first and second cylindrical members so that flexure can occur on said central axis of said first and second cylindrical members on said common axis, said pair of arms of said first one of said two flexible members extending from the reduced cross-section portion on either side thereof to said first and second opposed bar member, said pair of arms of said second one of said two flexible members extending from the reduced cross-section portion on either side thereof to said first and second opposed bar members and said pair of arms of said two flexible members having a greater thickness in a direction lying in a plane lying in a diameter of said first and second cylindrical members than they have in a direction normal to said plane.

* * * * *